May 25, 1965   J. L. SHANKS ETAL   3,185,249
COMPUTING SEISMIC INFORMATION
Filed March 20, 1959   4 Sheets-Sheet 1

Kay N. Burns
John L. Shanks
Duane E. Soland   Inventors

By John D. Gassett   Attorney

Kay N. Burns
John L. Shanks
Duane E. Soland    Inventors

By *John D. Gassett*    Attorney

May 25, 1965  J. L. SHANKS ETAL  3,185,249
COMPUTING SEISMIC INFORMATION
Filed March 20, 1959  4 Sheets-Sheet 3

Kay N. Burns
John L. Shanks
Duane E. Soland  Inventors
By *John D. Gassett*  Attorney

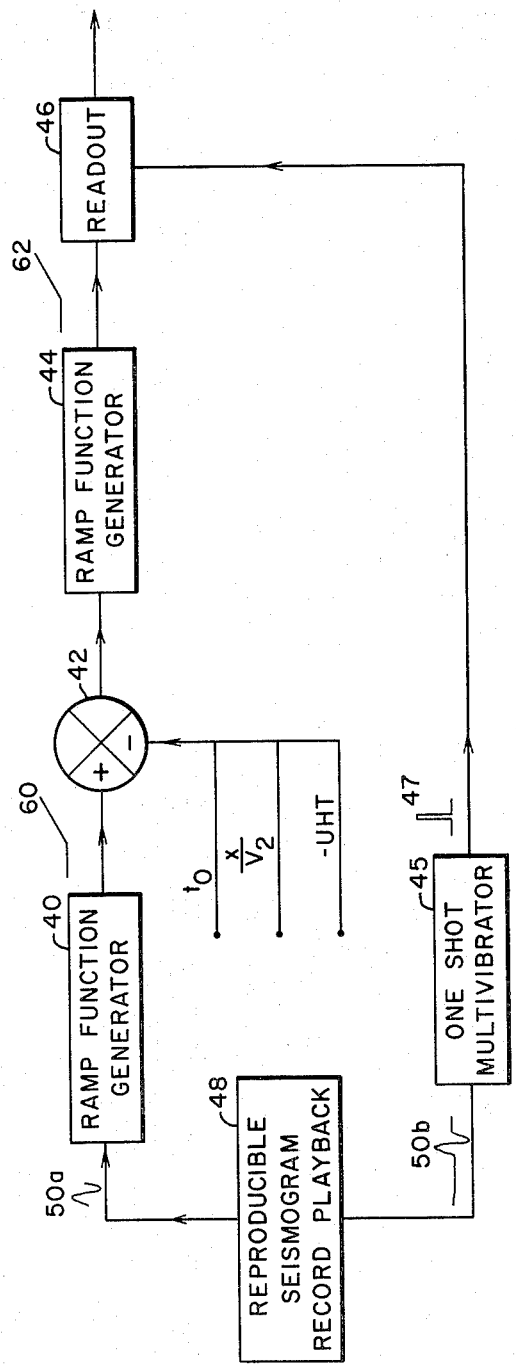

United States Patent Office 3,185,249
Patented May 25, 1965

3,185,249
COMPUTING SEISMIC INFORMATION
John L. Shanks, Duane E. Soland, and Kay N. Burns, Tulsa, Okla., assignors, by mesne assignments, to Esso Production Research Company
Filed Mar. 20, 1959, Ser. No. 800,700
8 Claims. (Cl. 181—.5)

This invention is broadly concerned with a system for computing subsurface information from seismic records. More particularly, the invention is concerned with a system for computing the velocity of energy transmission through a sublayer which is the first high velocity layer encountered and is just below the low velocity or weathering layer of the earth. The invention is further concerned with a system for determining the depth to the top of the sublayer of earth which is also equivalent to the thickness of the low velocity layer.

Geophysical prospecting procedures using artificially induced seismic disturbances have found wide application in the search for petroleum and other mineral deposits. It is general practice to initiate an explosive or other seismic disturbance at a point near the surface of the earth and to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance points, it is possible to detect the arrival of the reflected seismic waves at various points on the surface of the earth. Furthermore, by using accurate timing devices and recording means, it is possible to determine not only the magnitude of the signals received from the various geophones, but also to measure the time required for the seismic waves to travel from the disturbance points down to the various discontinuities and then to the geophone. It is well known to those in the art that it is possible to calculate or determine the depth of the various discontinuities beneath the surface of the earth.

In making a study and analysis of seismic information and records among other things, it is desired to know (1) the velocity of the transmission of energy through the sublayer, and (2) the depth to the sublayer at each geophone location which is equivalent to the thickness of the low velocity layer at that point. The low velocity layer is generally meant the weathering layer which is the top layer of the earth's structure and is characterized by having a relatively low velocity of transmission of energy therethrough. The term sublayer as used herein is meant to be that layer of earth substrata immediately below the low velocity layer. The velocity of transmission of energy through the sublayer is usually considerably greater than the velocity in the low velocity layer.

There are known mathematical ways and techniques for determining (1) the velocity of the transmission of energy in the sublayer and (2) the depth to the sublayer at each geophone location. This procedure of course is quite time consuming. It is therefore one object of the present invention to provide automatic means for determining the velocity of the sublayer.

It is another object of the present invention to provide automatic means for determining the depth to the sublayer.

Other objects will be explicitly described or will be readily apparent from the following description.

In a preferred embodiment, this invention relates to a system for automatically computing the velocity of the sublayer directly from a reproducible seismic record and for determining the thickness of the low velocity layer. A reproducible seismic record such as magnetic tape normally has a separate time channel upon which is recorded the occurrence of the shot or explosion and the occurrence thus recorded is called the time break. The other channels on a record, among other things, record the occurrence of the first energy reaching the geophone, which is called the first arrival or first kick. The manual or graphical method for computing the velocity of the sublayer comprises plotting the times of the first arrivals or first kicks to the geophone versus the distance to the geophone. A straight line is drawn through the latter points on a graph. The inverse of the slope of this line is representative of the velocity of the sublayer. In the practice of this invention the signals or traces from the various geophone locations are reproduced and fed simultaneously to individual pulse generators in order that a pulse is generated upon the arrival of each first kick. These pulses are added together and will appear as a series of pulses whose rate of occurrence depends upon the rate of occurrence of first kicks. This rate is metered by a pulse rate circuit whose output is proportional to the average pulse rate and is therefore proportional to the velocity in the sublayer. This output can be stored, read, or used instantaneously in a computer.

The velocity thus determined for the sublayer is used in an electronic analog computer together with other factors to determine the thickness of the low velocity layer. In this system it is assumed that energy transmission is by straight ray paths. The first break of a time trace representing the time of occurrence of the seismic shock is used to initiate the generation of a linearly rising voltage ramp. A constant voltage representing known or assumed times of wave transmission from the seismic shock source to the time the wave energy leaves the sublayer and enters the low velocity layer is subtracted from the linearly rising voltage ramp. When the voltage of the linearly rising voltage ramp, after having the known voltages subtracted therefrom, reaches zero, a second linearly rising voltage ramp is initiated. When the first kick is received a readout mechanism reads out the value of the second voltage ramp. This instantaneous value which is read out represents the time the wave energy was in the low velocity layer and is indicative of the thickness of the low velocity layer.

Before entering into a detailed description of the invention, it is well to note that several terms are assumed to have the following meanings for the purpose of this description. The term seismic trace or channel is intended to mean the record formed on a recording medium by reception of a train of signals from individual geophone locations. The individual geophone locations may of course be composed of several geophones. Each trace is, in effect, a record with time of the occurrence and magnitude of the signals received. The term seismogram record is intended to mean a multiple trace recording of the plurality of geophone signals from the seismic observation. Each record normally has one channel which is a time trace; the first recognizable feature on the time trace is the time break which records, in time, the occurrence of the seismic shock. The term recording medium or record medium in this description is intended to mean a reproducible type recording medium such as magnetic tape adapted to receive seismic information.

Other objects and a better understanding of the invention may be had from the following description taken in conjunction with the drawing in which:

FIG. 7 illustrates an apparatus for automatically computing the thickness of the low velocity layer.

Figure 1:
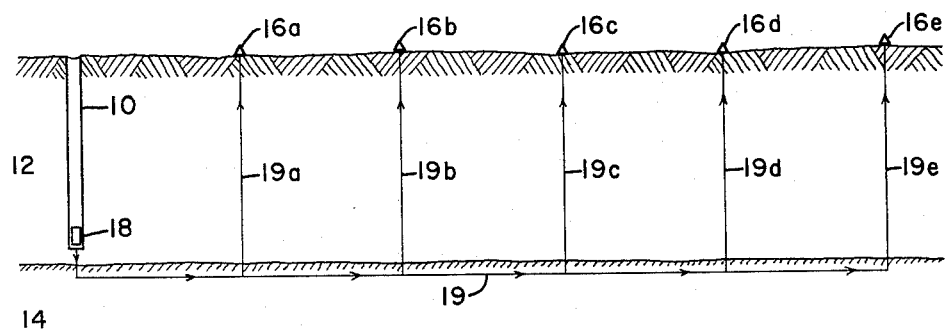
FIG. 1 illustrates a cross section view of the earth showing a shot hole, geophones, and straight ray paths of energy.

Attention is directed to FIG. 1 in which a shot hole 10 has been drilled in the earth's surface. The shot hole, for this illustration, has not penetrated through an upper weathered or low velocity layer 12. Below low velocity layer 12 is a sublayer 14 which normally has a velocity of wave energy transmission considerably greater than the velocity of the low velocity layer 12. A charge 18 is placed in shot hole 10 and a series of seismic transducers or geophones 16a through 16e are spaced from the shot hole 10. The geophones are preferably equally spaced from each other and are normally placed in a substantially straight line from the shot hole 10. Line 19, with laterals 19a through 19e, represents straight ray paths of the shortest distances, timewise, for energy from seismic shock from charge 18 to travel to geophones 16a through 16e respectively.

The seismic interpreter often needs to know the velocity of energy transmission in sublayer 14. There is a graphical manual method for computing this velocity which is designated herein as $V_2$. The present invention discloses a system for automatically computing this velocity $V_2$ directly from information received either directly from seismic transducers or reproduced from reproducible seismogram records.

Figure 2:
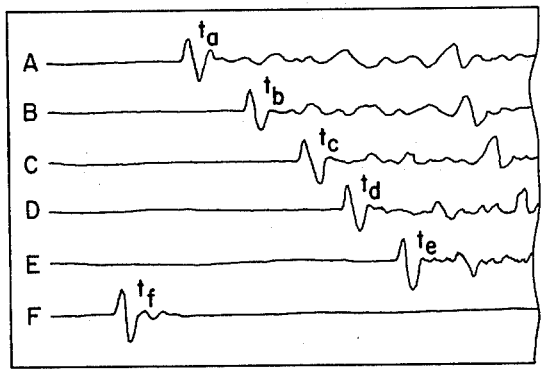
FIG. 2 illustrates the beginning portion of a typical seismogram record.

Attention is now directed to FIG. 2 which illustrates a beginning portion of a seismogram record. Channels A, B, C, D, and E represents signals received from geophones 16a through 16e respectively. The occurrence of the first kicks or first arrivals are represented by $t_a$ through $t_e$ respectively. Channel F represents the time channel and $t_f$ indicates the occurrence of the seismic shock which is called the time break.

Figure 3:
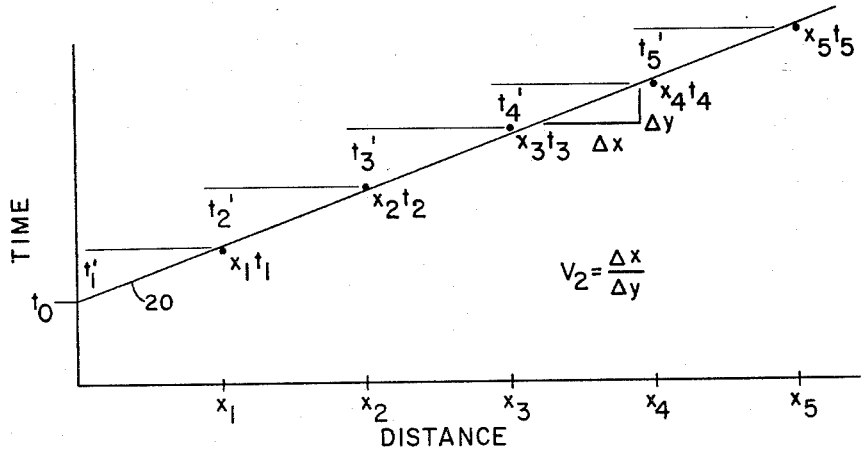
FIG. 3 represents a graphical means of determining the velocity of the sublayer.

Attention is now directed to FIG. 3 which illustrates a manner in which velocity $V_2$ may be obtained graphically. In FIG. 3 the abscissas or $x$ axis represents the distance of the geophones from shot hole 10. The $y$ axis or ordinate axis represents time. The times of the "first kick" or first arrival of the seismic signal to each geophone is plotted versus the distance to the geophone. A straight line 20 is drawn through the points thus plotted on the graph. The velocity of a sublayer, $V_2$, is equal to the reciprocal of the slope of line 20 or in other words, $V_2$ is equal to $$\frac{\Delta x}{\Delta y}$$

Figure 4:
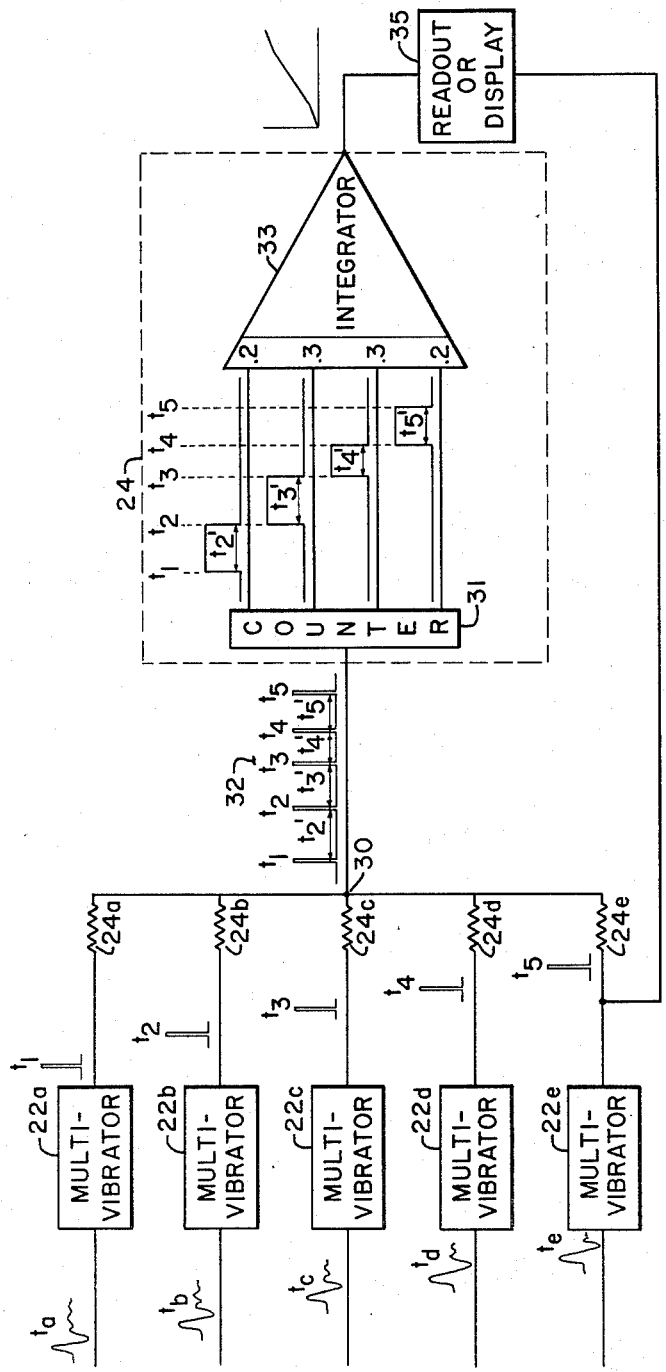
FIG. 4 illustrates in block diagram form an apparatus for automatically computing the velocity of transmission of energy in the sublayer.

Attention will now be directed to FIG. 4 which illustrates a system from which $V_2$ or the velocity of the sublayer can be automatically determined.

Electrical signals, representative of the seismic signals from each geophone 16a through 16e are fed through one-shot multivibrators 22a to 22e respectively. These signals 16a through 16e may be taken directly from geophones 16a through 16b but will normally be reproduced signals reproduced from a reproducible seismic record. Multivibrators 22a through e are each of a character that will generate a positive pulse when their respective input signal first reaches a predetermined amplitude which indicates the first kick. The generator positive pulses $t_1$ through $t_5$ are staggered in time of occurrence as the first kicks $t_a$ through $t_e$ illustrated in FIG. 2. The output pulse from each multivibrator 22a through e is fed through adding resistors 24a through e respectively. These adding resistors 24a through e isolate multivibrator 22a through e respectively from the common adding point 30. The signal at the adding point 30 is illustrated at 32 and is seen to include the time pulses $t_a$ through $t_e$. The series of pulse waves 32 is fed to pulse rate circuit 24. Pulse rate circuit 24 will be fully explained hereinafter. Pulse rate circuit 24 averages the rate of occurrence of the individual pulses $t_1$ through $t_5$ which make up signal 32. This rate is expressed in terms of a voltage output from pulse rate circuit 24 which is indicative of the velocity $V_2$ of the sublayer. The output voltage from pulse rate circuit 24 may be fed to item 35 which may represent a meter which reads the velocity, a storage means, or a computer, or the like.

A suitable pulse rate circuit 24 is now more fully explained. It includes a counter 31 and an integrator 33. A suitable counter may be a gas counter such as the "Dekatron" Model GS10C manufactured by Baird-Atomic, Inc. of 33 University Road, Cambridge 38, Massachusetts. A suitable integrator 33 is illustrated on pages 19 and 20 in Electronic Analog Computers by Korn & Korn, published by McGraw-Hill Book Co. of New York, New York. Referring back to FIG. 3 it is seen that $V_2$ which is the velocity of the sublayer or high velocity layer is equal to the slope of line 20 or $$\frac{\Delta x}{\Delta y}$$

From the curve and data illustrated in FIG. 3 the following two least squares equations may be developed.

(1) $$\sum_{i=1}^{n} t_i = nt_0 + m \sum_{i=1}^{n} x_i$$

(2) $$\sum_{i=1}^{n} x_i t_i = t_0 \sum_{i=1}^{n} x_i + m \sum_{i=1}^{n} x_i^2$$

These equations are solved following the least square method of obtaining a linear empirical equation as described more completely on pages 473 to 478 of "First Year of College Mathematics" by Henry J. Miles, published by John Wiley & Sons, Inc., New York, New York. For $n$, a given number of data points, the solutions to the simultaneous Equations 1 and 2 give the values of $t_0$ and $m$ which give the least mean square error between the observed data $(x_i, t_i)$, and the straight line $t = mx + t_0$. Referring to FIGURE 3, the $m$ in Equations 1 and 2 represents the slope of a line drawn through the points $(x_i, t_i)$. For the purposes of illustration, there are only five ($n=5$) data points shown in FIGURE 3. Since the time delay between arrival times of the energy wave between consecutive geophones is the same as the travel time of the wave in the high velocity layer, the geophone spacing divided by the time delay, $$\frac{\Delta x}{t_{i+1} - t_i}$$

is a measure of the velocity $V_2$ of the high velocity layer. $V_2 = 1/m$ is the best estimate of $V_2$ from all the data points.

By solving Equations 1 and 2 for $n=5$, the solution for $m$ is Equation 3.

(3) $$m = \frac{1}{\Delta x}\{.2t_2' + .3t_3' + .3t_4' + .2t_5'\}$$

where $\Delta x$ is the spacing from geophone to geophone, and $t_2' = t_2 - t_1$, $t_3' = t_3 - t_2$, $t_4' = t_4 - t_3$, and $t_5' = t_5 - t_4$. Thus Equation 3 gives the best estimate of $m$, which is the reciprocal of the velocity $V_2$.

Referring now to FIG. 4, pulses 32 representing time $t_1$, $t_2$, $t_3$, $t_4$, and $t_5$ are fed to a multi-state counter 31. Counter 31 receives the pulse train 32 and changes state upon the occurrence of each pulse. During each time interval $t_i$, an output from counter 31 is fed to the appropriate input of integrator 33. $t_2'$ is equal to the time between $t_1$ and $t_2$ and is fed to a first input of integrator 33 which has a multiplying factor of .2. $t_3'$, the time between $t_2$ and $t_3$, is fed to the second input of integrator 33 which has a multiplying factor of .3. $t_4'$ which is the time between $t_3$ and $t_4$ is fed to the third input of integrator 33 which has a time constant of .3. $t_5'$ the time between $t_4$ and $t_5$ is fed to the fourth input of integrator 33 which has a multiplying factor of .2. The multiplying factors are taken from Equation 3 above. The integrator solves Equation 3 above by operating on its input signals. At the time $t_k = t_5$ the output signal of the integrator has reached a value proportional to the slope of line 20. Time pulse $t_5$ from one-shot multivibrator 22e is fed to readout means 35 to signal the time $t_k$. At time $t_5$ readout means 35 "reads" or otherwise displays a number representing the voltage of the output of integrator 33. The velocity of the energy in the sublayer is equal to the geophone spacing $\Delta x$ divided by the number read from readout means 35 for example. It is of course obvious that any number of geophones may be used in this system and the Equations 1, 2, and 3 would accordingly be modified.

In the interpretation of seismic records it is normally desired to know the thickness of the low velocity layer of the earth. The average thickness of the low velocity layer may be known for a given area; however, it is normally desired to determine the thickness of the low velocity layer for each geophone location which is represented by each trace of a seismic record. The depth or thickness of the low velocity layer can be calculated or determined manually.

Figure 5:
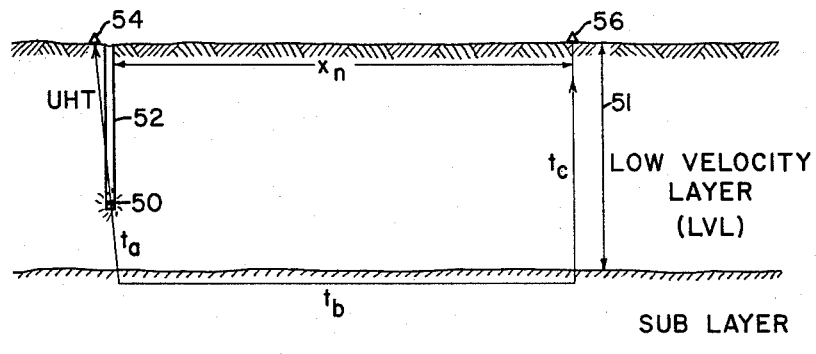
FIG. 5 illustrates a cross section of a low velocity layer and a high velocity layer of the earth and illustrates the shortest ray paths, in time, from the seismic shock to a geophone.

Referring to FIG. 5 it is seen that shot 50 is placed in shot hole 52 and detonated. In this illustration shot hole 52 does not extend through the lower velocity layer. A geophone 54 is placed relatively close to the shot hole, normally within about two feet; and a second geophone 56 is spaced from shot hole 52 a comparatively larger distance. Geophone 56 may be placed from as close as 100 feet or closer to shot hole 52, to as far away as 2500 feet or more. When shot 50 is detonated the shortest path timewise for energy to be transmitted from the shot 50 to the geophone 56 is represented by $t_a$, $t_b$, and $t_c$. $t_a$ represents the time from the shot to the wave energy entering the higher velocity sublayer which is just below the low velocity layer; $t_b$ represents the time the energy is in the higher velocity or sublayer and $t_c$ represents the time the energy is in the lower velocity layer after having left the high velocity layer.

In geophysical operations the time that shot 50 is detonated and the time that the first kick or first energy from shot 50 reaches geophone 56 are accurately recorded. If this time is designated $t_n$, Equation 4 follows and is generally accepted.

(4) $\qquad t_n = t_a + t_b + t_c$

It is generally accepted that $t_a$ is equal to $t_0 - UHT$ where $t_0$ is known and is the time of the intersection of line 20 with the y axis of the graph of FIG. 3 and is commonly taken to be the time for an energy pulse to pass through an average low velocity layer thickness; and UHT is the up hole time. The thickness of the low velocity layer is indicated by line 51. It is also generally accepted that $t_b$ is equal to $x_n/V_2$ where $x_n$ is the distance geophone 56, in this illustration, is from shot hole 52, and $V_2$ is the velocity of the high velocity layer.

By substituting generally accepted terms for $t_a$ and $t_b$ in the Equation 4 above the following equation results.

(5) $\qquad t_n = (t_0 - UHT) + \frac{x_n}{V_2} + t_c$

Figure 6:
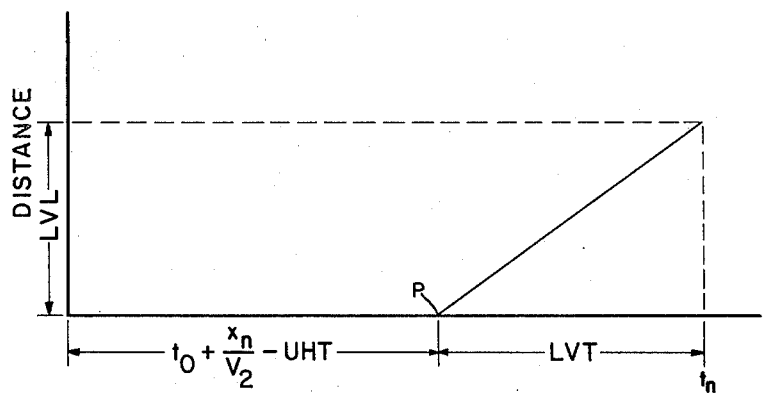
FIG. 6 illustrates a graphic way for determining the thickness of the low velocity layer.

This equation may be written or shown in simplified draft form as illustrated in FIG. 6 in which the abscissa represents time and the ordinate represents distance. A value representing $$t_0 + \frac{x_n}{V_2} - UHT$$

is plotted on the abscissa. At the point P, a linearly rising line is plotted; at the time equal $t_n$ the value of the linearly rising line is read. By proper scaling, the thickness of the lower velocity layer can be read directly from the graph in FIG. 6. To perform this operation manually for a large number of traces, of course, requires considerable time. While the performance of this task is not insurmountable, its automatic solution greatly reduces the requirement of an operator's time for determining the thickness of the low velocity layer, especially if this could be done without actually preparing a graph for each trace or otherwise making manual measurements.

A device for performing this function automatically is shown in FIG. 7. In that figure are illustrated a first generator 40, an adder 42, a second generator 44 and readout means 46. First generator 40 is preferably a saw tooth generator which has a constant linear rising voltage output upon being triggered by a pulse. Adder 42 is a point for summing the voltages and may be a vacuum tube such as a high gain D.C. amplifier. Adder 42 is thus seen to be a circuit means for subtracting $$t_0 + \frac{x}{V_2} - UHT$$

from ramp voltage 60. A suitable adder is described in Chapter 1, "Electronic Analog Computers" by Korn & Korn, supra. Second generator 44 may be similar to first generator 40 and is likewise preferably a saw tooth generator whose output is a linear constant rising voltage with respect to time. The voltage output of generator 44 begins to rise when the voltage of the input signal reaches zero.

Readout 46 is in a device capable of recording the instantaneous value of the voltage ramp from generator 44. For a discussion of a voltage sampling device or readout circuit, reference is made to Chapter 4 in "Servo Mechanism Analysis" by Thaler and Brown, published in 1953 by McGraw-Hill Book Co., Inc. of New York, New York. A seismic record reproducing means 48 is provided. The output signal of a trace representing the time break and reproduced by reproducing means 48 is connected to ramp function generator 40. The output signal from reproducing means 48 representing the trace of the geophone location under consideration is connected to one shot multivibrator 45 which is similar to multivibrator 22. The output of multivibrator 45 is connected to readout 46.

In the operation of the mechanism shown in FIG. 7 it will be noted that there are two points reproduced from the record which are of importance in the explanation and operation of this system. They are: (1) the time break indicated at 50a, and (2) the first kick indicated at 50b. Time break 50a represents the time shot 50 was detonated in shot hole 52 and first kick 50b represents the occurrence of the first kick or first energy from shot 50 being received by geophone 56.

Having briefly described the components of FIG. 7, attention will now be directed toward the operations of this device. Before reproduction of the seismic record is begun a negative voltage is applied to adder 42 which is applied to adder 42 which is representative of (a) $t_0$, (b) $x_n/V_2$ and (c) $-UHT$. If desired the voltage representing (b) $x_n/V_2$ may be taken directly from readout 35 shown in FIG. 4. A trace of a seismic record is played back from playback means 48 and the output is fed to multivibrator 45. At the same time the time break trace is played back, its output is fed to ramp generator 40. Upon receiving time break 50a, saw tooth generator 40 starts generating a linearly rising voltage which is represented at 60. The voltage ramp 60 is fed to adder 42.

The instant that the output voltage from adder 42 has risen to 0, generator 44 starts generating a constant linear rising voltage illustrated at 62. The linear rising voltage at 62 has a slope $$V_1 = \frac{D}{UHT}$$

where referring to FIG. 5, D is the depth of the dynamite hole 52 which is known, UHT is the time for the first energy to reach the surface, and $V_1$ is thus the velocity of the low velocity layer. Thus voltage 62 at $t_n$, the time of the first kick 50b, is equal to the lower velocity layer thickness as illustrated in FIG. 6. Pulse 47, which is generated at the first kick time, causes readout 46 to display the value of voltage 62 at that time.

It will be understood that the apparatus and system contained in the above description are merely representative or illustrative and not limited and that numerous modifications may be made therein without departing from the scope of the invention.

What is claimed is:

1. An apparatus for determining the velocity of the transmission of wave energy of a sublayer of the earth from time intervals between first kicks received by seismic transducers which are spaced from a seismic shock source which comprises: reproducing means for reproducing said first kicks as a separate signal for each transducer; a multivibrator for each separate signal and electrically connected to said reproducing means and of a character to generate a positive pulse upon receiving said first kick; adding means for adding said positive pulses; and a pulse rate circuit means electrically connected to said adding means, said pulse rate circuit means including a counter having a plurality of output lines which are sequentially energized by pulses from said adding means, and an integrator means having an input means connected to each output line of said counter, each such input means including adjustable multiplying factor means.

2. A method of determining the velocity of the transmission of energy in a sublayer immediately below the low velocity layer of the earth's surface which comprises: initiating a seismic disturbance in the earth's surface; receiving and recording the first arrival of energy from said shock source with a plurality of seismic transducers extending radially from said seismic shock source and equally spaced from each other; generating a pulse for each first arrival of energy for each transducer; generating time interval pulses equivalent in time duration to the time between successive pulses representing first arrivals, weighing each time interval pulse according to the coefficient of a mathematical method of writing an empirical equation which computes the velocity of the sublayer; and integrating the time interval pulses thus weighted.

3. An apparatus for determining the velocity of a sublayer from the time intervals between the first kicks received by seismic transducers which are equally spaced which comprises: a one shot multivibrator electrically connected to each said transducer and of a character to generate a positive pulse upon receiving a first kick from said transducer; adding means for adding said positive pulses; a counter electrically connected to the output of said adding means, said counter having a plurality of output lines which are sequentially energized by pulses from said adding means, the duration of energization of each such output line representing time intervals between the corresponding pulses from said adding means and integrator means; having a plurality of input means connected to the output lines of said counter, each such input means including adjustable multiplying factor means.

4. An apparatus for determining the velocity of a sublayer from the time intervals between first kicks received by seismic transducers which are spaced from a seismic shock source which comprises: a multivibrator electrically connected to each said transducer and of a character to generate a positive pulse upon receiving a first kick from said transducer; adding means for adding said positive pulses; a pulse rate circuit means electrically connected to said adding means, said pulse rate circuit means including means for generating time interval pulses for the interval between successive positive pulses, weighing means for applying a multiplying factor independently to each such time interval pulse, and means for integrating the time interval pulses thus weighted.

5. In a seismic system having a seismic shock source near the earth's surface and a seismic transducer spaced from the shock source and reproducible recording means for recording the time of initiating a seismic shock and the time of arrival of energy from said seismic shock at said seismic transducer, an apparatus for determining the thickness of the low velocity layer under the seismic transducer which comprises playback means for reproducing said seismic record, said playback means having a first channel for reproducing the time of initiating a seismic shock and a second channel for reproducing the relative time of arrival of energy from said seismic shock; a first generator means electrically connected to the output of the first channel of said playback means to generate an output signal which has a linearly rising voltage upon receiving a signal from said first channel; a source of a preselected negative voltage means for adding the output voltage of said first generator to the preselected negative voltage; a second generator means electrically connected to the output of said adding means to initiate the generation of an output signal which has a linearly rising voltage upon the input signal to said second generator means changing from negative to positive; readout means electrically connected to the output of said second generator means and electrically connected to the output of the second channel of said playback means, said readout means reading the instantaneous value of the output signal of said second generator upon receiving a signal from said reproducing means.

6. In a seismic system having a seismic shock source near the earth's surface and a seismic transducer spaced from the shock source and means for recording the seismic signal received by the transducer, an apparatus for determining the thickness of the low velocity layer under geophone location in which the thickness is equal to a constant multiplied by the time the energy is in the low velocity layer and in which such time is represented by the formula $$LVT = t_n - \left(t_0 + \frac{x_n}{V_2} - UHT\right)$$

where $t_n$ is the time of arrival of energy at the transducer, $t_0$ is known and is representative of the known average thickness of the low velocity layer, $x_n/V_2$ is known and represents the distance from the shot hole to the seismic transducers divided by the velocity of the sublayer and UHT is the uphole time, the apparatus which comprises: means for generating a positive constant rising linear voltage whose beginning represents the occurrence of said seismic shock, adding means to add the rising voltage to a negative voltage representative of $$t_0 + \frac{x_n}{V_2} - UHT$$

second means for generating a second positive constant rising linear voltage when the resulting voltage thus added reaches zero; and means for recording the instantaneous voltage of the output of said second generator means at a time representative of first receipt of energy transmitted from said seismic source to said transducer.

7. An apparatus for determining the thickness of a low velocity layer which comprises in combination: a seismogram record playback which has a first channel upon which is stored in reproducible form a time break and a second channel upon which is stored a first kick; a first ramp function generator means electrically connected to the first channel of record playback, said first ramp function generator being responsive to a signal from said first channel; a voltage source capable of supplying a preselected voltage whose polarity is opposite of the polarity of the output of said first ramp function generator; adding means to add the output of said first function ramp generator and a voltage from the voltage source; a second ramp function generator electrically connected to the output of said adding means and of a character to generate a rising linear voltage when the resulting voltage added by said adding means changes polarity; read-out means electrically connected to the output of said second ramp function generator and control means for actuating said read-out means, said control means being responsive to a signal recorded on said other channel.

8. In a seismic system having a seismic shock source near the earth's surface and a plurality of equally spaced seismic transducers spaced radially from a seismic shock source and in which a first break representing the time of initiation of the seismic shock is recorded on one channel of a recording medium and a first kick representing the arrival of energy from said seismic shock source at a first seismic transducer is recorded on a second channel; and reproducing means for reproducing independently signals representative of the first kicks representing the arrival of energy at each seismic transducer, an apparatus for determining the thickness of the low velocity layer under a seismic transducer in which the thickness is equal to a constant multiplied by the time the energy is in the low velocity layer and such time is equal to $$t_n - \left(t_0 + \frac{x_n}{V_2} - UHT\right)$$

where $t_n$ is the time of the arrival of energy at a selected transducer and $t_0$ is representative of the known average travel time in the low velocity layer; $x_n/V_2$ is travel time of the energy in the sublayer and $UHT$ is known uphole time, the system which comprises:

seismogram record playback means for reproducing independently of said reproducing means the first break recorded on said first channel and reproducing independently the first kick recorded on the second channel;
a plurality of multivibrators, each said multivibrator being of a character to generate a positive pulse upon receiving a signal;
means independently connecting each independent signal of said reproducing means to one of said multivibrators;
first adding means for adding said positive pulses;
a pulse rate circuit means electrically connected to said first adding means and whose output signal is inversely proportional to the rate of the occurrences of said positive pulses;
storage means to store a value representative of the output of said pulse rate circuit means which is representative of $x_n/V_2$ upon receiving a signal representing a first kick from said reproducing means representing a selected transducer;
a first ramp function generator means electrically connected to said playback means to generate an output signal which has a linearly rising voltage upon receiving a signal representing the first break;
a preselected voltage source representative of $t_0 - UHT$;
circuit means for subtracting the output from said storage means and said preselected voltage source from the output voltage of said first ramp function generator means;
a second ramp function generator means electrically connected to the output of said circuit means and being of a character to initiate the generation of an output signal which has a linearly rising voltage upon the input signal changing from negative to positive;
read-out means electrically connected to the output of said second generator means and electrically connected to the second channel of said seismogram record playback means, said read-out means being of a character to read the instantaneous value of the output signal of said second ramp function generator means upon receiving a signal from said second channel.

References Cited by the Examiner
UNITED STATES PATENTS

| | | | |
|---|---|---|---|
| 2,800,639 | 7/57 | Lee | 340—15 |
| 2,836,359 | 5/58 | Mazzagatti. | |
| 2,886,243 | 5/59 | Spraque et al. | 235—92 |
| 2,897,476 | 7/59 | Widess | 340—15 |
| 2,908,889 | 10/59 | Piety | 340—15 |
| 2,920,306 | 1/60 | Feagin et al. | 340—15.5 |
| 2,921,740 | 1/60 | Dobbins et al. | 235—150 |
| 2,928,071 | 3/60 | Feagin et al. | 181—0.5 |
| 2,938,592 | 5/60 | Charske et al. | 181—0.5 |
| 2,978,174 | 4/61 | Dean et al. | 235—92 |
| 2,978,673 | 4/61 | Graham | 181—0.5 |
| 3,018,839 | 1/62 | Isaacson | 181—0.5 |

FOREIGN PATENTS 805,266    8/36   France.

SAMUEL FEINBERG, *Primary Examiner.*
IRVING L. SRAGOW, CARL W. ROBINSON, CHESTER L. JUSTUS, *Examiners.*